May 23, 1961     H. K. KIENZLE     2,985,033
CONNECTING ROD

Filed Oct. 22, 1956     2 Sheets-Sheet 1

INVENTOR.
HAROLD K. KIENZLE
BY
ATTORNEYS

May 23, 1961 H. K. KIENZLE 2,985,033
CONNECTING ROD
Filed Oct. 22, 1956 2 Sheets-Sheet 2
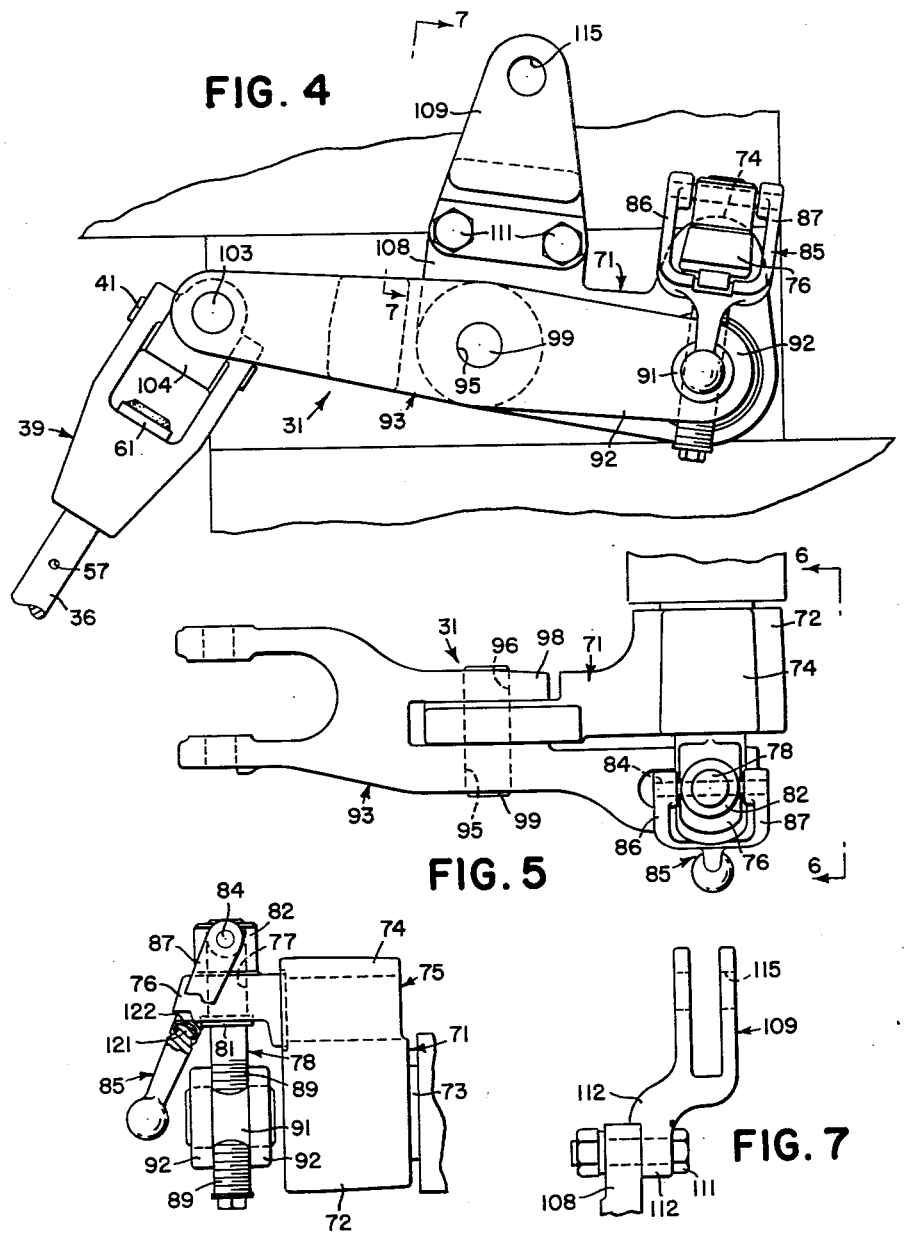
INVENTOR.
HAROLD K. KIENZLE
BY
ATTORNEYS United States Patent Office 2,985,033
Patented May 23, 1961

2,985,033
CONNECTING ROD

Harold K. Kienzle, Waterloo, Iowa, assignor, by mesne assignments, to Deere & Company, a corporation of Delaware Filed Oct. 22, 1956, Ser. No. 617,297

4 Claims. (Cl. 74—586)

The present invention relates generally to agricultural implements and more particularly to hitch devices for connecting an agricultural implement with a farm tractor to be propelled and/or supported thereby.

The object and general nature of the present invention is the provision of a new and improved adjustable locking link, and preferably but not necessarily one adapted to be incorporated in a hitch device that connects an agricultural implement with a tractor. More specifically, it is a feature of this invention to provide a locking link unit so constructed and arranged that by a simple adjustment of one part, the link unit may be adjusted to provide a limited amount of lost-motion or relative movement between the interconnected parts, and in another position of the movable member, all such lost-motion or relative movement is locked out.

A further feature of this invention is the provision of a new and improved lift arm construction that is so constructed and arranged to adjust the level of the associated implement, especially when in the float lockout position of the lift links.

These and other objects and advantages of the present invention will be apparent to those skilled in the art after a consideration of the following detailed description, taken in conjunction with the accompanying drawings in which:

Fig. 4 is an enlarged side view of the right hand lift arm construction and associated parts.

Fig. 5 is a top view of the construction shown in Fig. 4.

Fig. 6 is an end view, corresponding to a view taken along the line 6—6 of Fig. 5.

Fig. 7 is a sectional view taken along the line 7—7 of Fig. 4.

Figure 1:
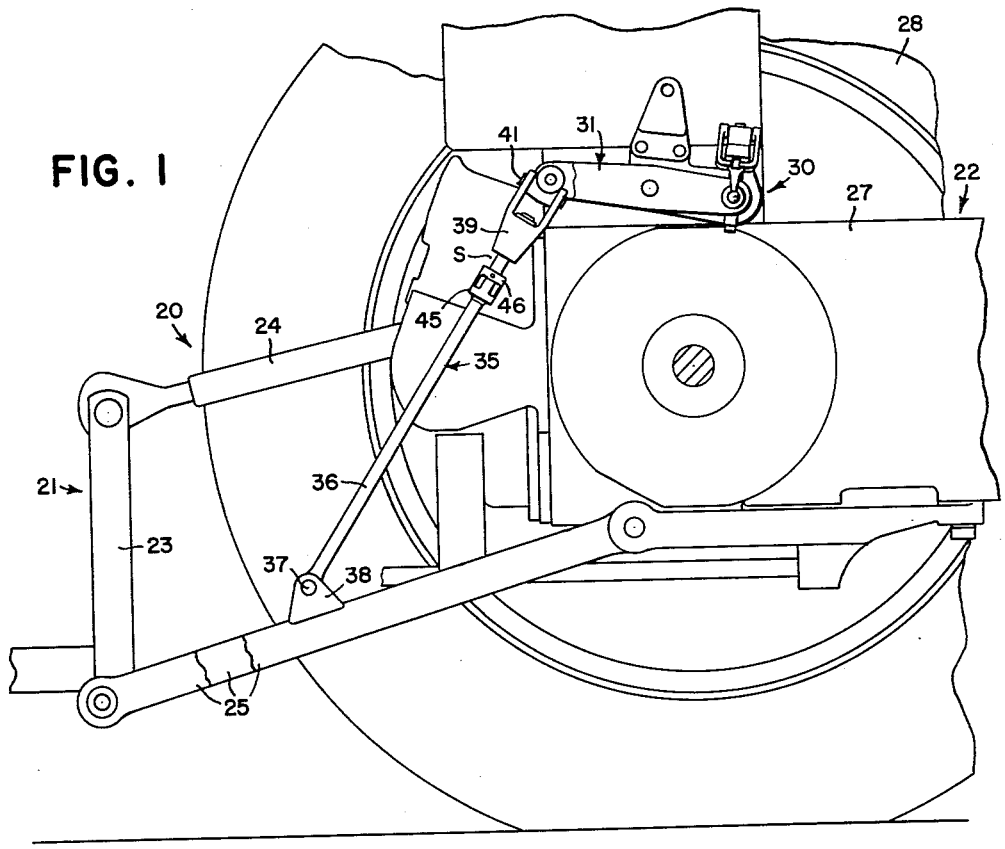
Fig. 1 is a side view, partly diagrammatic in nature, of the forward portion of an agricultural implement, the rear portion of a farm tractor, and an interconnecting hitch device in which the principles of the present invention have been incorporated.

Referring first to Fig. 1, the present invention has been illustrated as incorporated in hitch means 20 arranged to connect an agricultural implement 21 with a farm tractor 22. The implement 21 may be of any suitable character, and as shown represents a plow, the frame of which includes a generally vertical mast section 23 to which the upper and lower links 24 and 25 of the hitch 20 are connected. The tractor 22, to the rear end of which the forward ends of the upper and lower links 24 and 25 are pivotally connected, is also of generally conventional construction, embodying a main frame 27, in which the transmission and other parts are included, rear drive wheels 28, and a power lift unit 30 that includes a pair of lift arms 31, one at each side of the tractor. The rear or outer end of each of the lift arms 31 is connected with the associated lower link 25, there also being one of the links 25 at each side of the tractor, by a lift link structure 35. There is, or may be, one of the links 35 at each side of the tractor, but a detailed description of one will suffice.

Each of the link structures 35 comprises a lower rod member 36 having its lower end apertured and pivotally connected, as at 37, to a pair of lugs 38 fixed to the rear portion of the associated draft link 25. The upper end of each rod member 36 is slidably received in an upper connecting part 39 that preferably is in the form of a yoke or the like pivotally connected, as at 41, to the associated power lift arm 31. Means to this end will be described below in detail.

Figure 2:
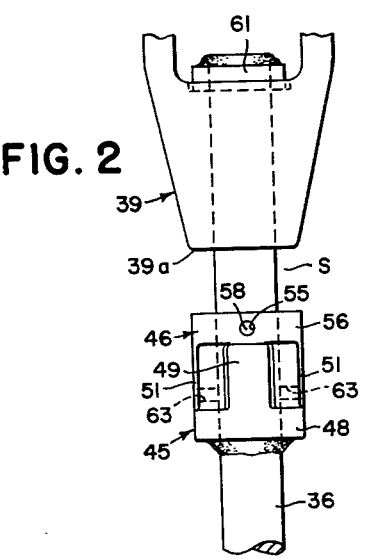
Fig. 2 is an enlarged fragmentary view, showing the principal feature of the adjustable locking link of the present invention.

A lower lift link spacer 45 is fixed to the rod member 36 at a point below the lower portion of the yoke 39, and a cooperating spacer member 46 is disposed for both rotation on and axial movement along the lift link rod member 36, lying between the fixed spacer 45 and the lower end 39a of the connecting part or yoke 39. The fixed spacer 45 is provided with a hub-like section 48 that is welded to the rod member 36 or otherwise fixed thereto, and extending axially toward the connecting part 39 is a pair of lugs or extensions 49 that are disposed directly opposite one another, or on opposite sides of the rod member 36. The axially and rotatably mounted spacer member 46 is provided with a pair of similar lugs or extensions 51, which are also disposed opposite one another, these lugs or extensions extending longitudinally of the rod member toward the base section 48 and interdigitating with the other lugs or extensions 49 to form, in one position of the spacers 45 and 46, overlapping parts, this being the position shown in Fig. 2 and which provides a substantial space S between the spacer member 46 and the end 39a of the yoke 39. In this position an opening 55 formed in the hub 56 of the spacer member 46 comes into registry with an opening 57 (Fig. 4) formed in the rod member 36, whereby when a pin 58 is disposed in the aligned openings, the spacer member 46 is held in its overlapping or interdigitated position with respect to the fixed member 45. In this position of each of the lift link structures 35, an implement connected to the tractor is capable of limited oscillation relative to the tractor about a generally fore-and-aft extending axis, this relationship being frequently termed "lateral float" and is particularly adapted for use with relatively wide implements, especially those having their own gauge wheels.

Figure 3:
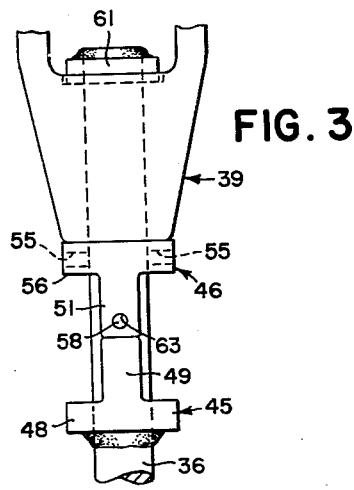
Fig. 3 is a view similar to Fig. 2, showing the adjustable link in its locked position.

If it should be desired to lock out all lateral float, all that it is necessary to do, according to the present invention, is to remove the pin 58 in each of the link structures 35, slide each spacer member 46 upwardly along the rod member 36 and then turn the spacer member 46 through approximately 90° so as to bring the extensions 51 into abutting or aligned position with respect to the extensions 49 on the fixed spacer 45. The extensions or lugs are so dimensioned that, as shown in Fig. 3, when they are thus in end-to-end contact, all of the lost-motion space S is taken up, and the rod members 36 held against any axial displacement with respect to the associated yoke members 39. The yokes or connecting parts 39 are held against movement off the end of the associated rod members by means of a washer or ring 61 that is welded to the upper end of each rod member 36 after the spacers are assembled thereon.

The shiftable spacer members 46 are adapted to be held in the extended position by virtue of openings 63 that are formed in the end portions of the extensions 51, these openings being in registry with the opening 57 in the rod member so as to receive the pin 58 when the latter is inserted through the opening 63 and the opening 57. The pin 58 may be any suitable quick attachable device ordinarily used for the detachable connection of parts.

According to the principles of the present invention, I provide adjusting means incorporated in each of the power lift arms 31 so as to be able to adjust the level of the implement particularly when all or substantially all lateral float is locked out, as in Fig. 3, thus rigidly maintaining the implement level relative to the tractor. Specifically, means is provided on each of the power operated lift links for shifting the point of connection of the connecting part or yoke 39 relative to the main body of the associated power lift arm.

Referring now to Figs. 4 and 5, the lift arm means 31 may be constructed so as to include a main lift arm part 71 that includes a hub section 72 fixed in any suitable way to the associated power lift rockshaft 73. The main lift arm member 71 includes an upwardly disposed boss extension 74 that is apertured to receive a screw-receiving pin 75, the laterally outer end 76 of which is flattened and offset upwardly. The section 76 is provided with a generally vertically extending opening therethrough, shown at 77, and an adjusting screw 78 is disposed rotatably therein. The member 78 carries a lower abutment collar 81 and an upper head 82 that is fixed to the screw 78 by a crosspin 84, the latter also receiving and serving as a pivotal support for the bifurcated end of a handle yoke 85. The latter includes side sections 86 and 87 that are adapted to be disposed on opposite sides of the pin extension 76, whereby, as shown in Fig. 4, the handle 85 in its lower position embraces the section 76 and cooperates therewith to prevent undesired rotation of the pin or screw 78. The lower end of the latter member is screw threaded, as shown at 89 (Fig. 6), and adjustably received within a nut member 91 that is carried in the bifurcated portion 92 of an adjusting arm 93. The latter arm is provided with a generally central apertured section 95, and a similar apertured section 96 is formed in a side extension 98 of the member 93. These apertured sections form a generally centrally located bifurcated section of the adjusting arm 93. The apertures 95 and 96 are aligned and receive a pivot member 99 that pivotally supports the adjusting arm 93 on the main lift arm 71. The rear or outer end of the adjusting arm 93 carries a pivot 103 with which a swivel member 104 is connected. The swivel member 104 pivotally receives the upper end of the connecting yoke 39, the swivel block 104 being apertured to receive the pivot 41 mentioned above.

If desired, the main arm section 71 may carry a vertical extension 108 by which an implement actuating yoke 109 is connected with the power lift arm member 71, preferably by a detachable connection that includes a pair of bolts 111. The bolts 111 extend through the lower shouldered section 112 of the yoke 109 which is apertured to receive the bolts 111. The outer portion of the yoke 109 is apertured, as at 115, to receive connections by which an implement part may be operated by the arm 71 more or less independent of the position of the adjustment of the adjusting arm 93 on the member 71.

The position of the adjusting arm 93 relative to the power lift arm 71 may be changed, as desired, merely by swinging the handle 85 outwardly to disengage the sides 86 and 87 from the extension 76 and then using the handle to turn the screw member 78. The latter action results in a pivoting of the adjusting arm 93 on the outer end of the main lift arm 71, and the position of adjustment may then be retained by swinging the handle back over the pin extension 76.

In order to insure that the handle 85 will not accidentally become disconnected or displaced from its screw locking position, the generally central portion of the handle is formed with a headed lug 121 over which a generally U-shaped spring member 122 is disposed. The member 122 is resilient and, as best shown in Fig. 6, acts against the extension 76 to prevent accidental displacement of the arm 85, but the spring 122 does not prevent manual movement of the arm 85 to a position to turn the screw member 78.

When the maximum depth or maximum transport clearance is required, both lift arm adjusting screws 78 can be turned in the same direction to gain additional working depth or height of lift.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An adjustable link connection between a pair of relatively movable parts, movement of which it is desired to optionally limit or prevent, said link connection comprising a pair of spacers, means rigidly connecting one of said spacers with one of said parts, the other spacer being rotatable and axially shiftable along said one part relative to said one spacer, means securing the other spacer in either of two axially and rotatably displaced positions on the said one part, and cooperating means on said shiftable spacer and said one part to lock the latter and said shiftable spacer in either position of said shiftable spacer on said one part.

2. An adjustable link adapted to be incorporated in a connection between an implement and a tractor, said link comprising a yoke, a rod having a slidable connection with said yoke, a ring fixed to one end of said rod and cooperating with said yoke to limit movement of the rod in one direction relative to said yoke, an abutment fixed to said rod at the side of said yoke opposite said ring, a spacer loosely mounted on said rod between said abutment and said yoke, extensions on said spacer and abutment, said extensions being constructed and arranged so as to be disposable optionally in either abutting end-to-end relation or alongside one another in overlapping relation, the length of said extensions being such that when disposed in abutting end-to-end relation said spacer acts against said yoke and holds the latter against movement away from said ring, movement of said spacer into said overlapping relation accommodating movement of said yoke in the other direction away from said ring, and means on the end of the rod opposite the yoke to connect the rod to the implement.

3. In a lift link for a tractor-implement hitch, a rod member, a connecting part axially shiftable on said rod member, a first spacer fixed to said rod member adjacent but spaced from said part, a spacer member disposed between said fixed spacer and said part and both rotatable and slidable axially relative to said rod member, one of said members having an opening and the other member having a pair of axially spaced apart circumferentially spaced openings either of which may optionally be aligned with said first opening for optionally holding said spacer member in either of two axially and rotationally spaced apart positions on said rod member, and said spacer and spacer member having axially extending lugs adapted in one relative position to be interdigitated and in another portion to be abutted in end to end relation, and locking means insertable through said openings when aligned in either of said positions, said one position allowing relative axial movement between said rod member and said part and the other position preventing said relative axial movement, means to connect said connecting part to one of said implement and tractor, and means to connect the rod member to the other of said implement and tractor.

4. In a power lift arm and link construction for a tractor-implement hitch, the combination of a power lift arm, and a lift link construction adapted to be connected with said arm and including a pair of relatively movable parts, a spacer fixed to one part, an adjustable spacer movably disposed on said one part and disposed between said fixed spacer and the other part, each of said spacers having one or more axially extending lugs, the lugs of said spacers being adapted to be disposed in interdigitated position or in abutting end-to-end position, said lugs when in said latter position acting through said spacers to hold said parts against relative movement, means locking the adjustable spacer in either of said positions, and means to connect said relatively movable parts with the implement and tractor, respectively.

References Cited in the file of this patent

UNITED STATES PATENTS

| | | |
|---|---|---|
| 1,386,559 | Fegeley | Aug. 2, 1921 |
| 1,435,433 | Friggs | Nov. 14, 1922 |
| 1,992,743 | Durham | Feb. 26, 1935 |
| 2,064,405 | Benatar | Dec. 15, 1936 |
| 2,541,964 | Hennings | Feb. 13, 1951 |
| 2,584,012 | Griffin | Jan. 29, 1952 |
| 2,648,268 | Lindeman | Aug. 11, 1953 |
| 2,713,298 | Lindeman et al. | July 19, 1955 |
| 2,775,180 | Du Shane | Dec. 25, 1956 |